(12) United States Patent
Perez Barrera et al.

(10) Patent No.: US 10,556,584 B2
(45) Date of Patent: Feb. 11, 2020

(54) VEHICLE VISION

(71) Applicant: Ford Global Technologies, LLC, Dearborn, MI (US)

(72) Inventors: Oswaldo Perez Barrera, Texcoco (MX); David Franco Lopez Rubio, Lerma (MX); Rodrigo Frieventh C, Toluca (MX); Humberto Morales, Naucalpan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 15/866,319

(22) Filed: Jan. 9, 2018

(65) Prior Publication Data
US 2019/0210593 A1 Jul. 11, 2019

(51) Int. Cl.
| | |
|---|---|
| *B60W 30/06* | (2006.01) |
| *A47L 5/38* | (2006.01) |
| *A47L 9/24* | (2006.01) |
| *B60W 10/04* | (2006.01) |
| *B60W 10/184* | (2012.01) |
| *B60W 10/20* | (2006.01) |
| *G01B 11/25* | (2006.01) |
| *G05D 1/00* | (2006.01) |

(Continued)

(52) U.S. Cl.
CPC ............... *B60W 30/06* (2013.01); *A47L 5/38* (2013.01); *A47L 9/242* (2013.01); *B60W 10/04* (2013.01); *B60W 10/184* (2013.01); *B60W 10/20* (2013.01); *G01B 11/25* (2013.01); *G05D 1/0088* (2013.01); *G05D 1/021* (2013.01); *G06K 9/00805* (2013.01); *B60W 2420/403* (2013.01); *B60W 2550/147* (2013.01)

(58) Field of Classification Search
CPC ..................................................... B60W 30/06
See application file for complete search history.

(56) References Cited

U.S. PATENT DOCUMENTS

| | | |
|---|---|---|
| 5,163,319 A | 11/1992 | Spies et al. |
| 8,890,713 B2 | 11/2014 | Breuer et al. |

(Continued)

FOREIGN PATENT DOCUMENTS

| | | |
|---|---|---|
| DE | 102008063564 A1 | 6/2010 |
| EP | 3090900 A1 | 11/2016 |

(Continued)

OTHER PUBLICATIONS

Kim et al. article entitled "Wet area and puddle detection for Advanced Driver Assistance Systems (ADAS) using a stereo camera," International Journal of Control, Automation and Systems, Feb. 2016, vol. 14, Issue 1, pp. 263-271.

(Continued)

*Primary Examiner* — Bao Long T Nguyen
*Assistant Examiner* — Michael A Berns
(74) *Attorney, Agent, or Firm* — Frank A. MacKenzie; Bejin Bieneman PLC (57) ABSTRACT

A system includes a processor and a memory. The memory stores instructions executable by the processor to detect water on a ground surface, actuate a vehicle exterior light to illuminate a grid pattern on the ground surface, detect a depression at a location of the detected water based on received reflections of the grid pattern, and move a vehicle based on the detected depression.

16 Claims, 4 Drawing Sheets

(51) Int. Cl.
*G05D 1/02* (2006.01)
*G06K 9/00* (2006.01)

(56) References Cited

U.S. PATENT DOCUMENTS

| | | | |
|---|---|---|---|
| 9,460,353 B2* | 10/2016 | Rankin | G06K 9/00805 |
| 9,499,172 B2* | 11/2016 | Urmson | B60W 40/06 |
| 10,082,795 B2* | 9/2018 | Zhao | B60T 8/00 |
| 10,223,915 B2* | 3/2019 | Haines | G08G 1/161 |
| 2012/0194356 A1 | 8/2012 | Haines et al. | |
| 2019/0102634 A1* | 4/2019 | Sagami | G06K 9/00812 |

FOREIGN PATENT DOCUMENTS

| | | | |
|---|---|---|---|
| JP | 2009190560 A | | 8/2009 |
| JP | 2009199154 A | * | 9/2009 |
| KR | 20150024030 A | | 3/2015 |

OTHER PUBLICATIONS

Lawrence article entitled "Puddle Detection," https://daniel.lawrence.lu/programming/puddle/[Oct. 26, 2017 11:13:18 AM], © Daniel Lawrece Lu. Page generated on Jul. 26, 2017 by dllup.

NEWATLAS article entitled "Lumigrides—the LED projector that keeps cyclists out of potholes," https://newatlas.com/lumigrids-led-projector/27691/[Oct. 26, 2017 11:11:48 AM].

Von Enzberg et al. article entitled "Surface Quality Inspection of Deformable Parts with Variable B-Spline Surfaces,"A. Pinz et al. (Eds.): DAGM/OAGM 2012, LNCS 7476, pp. 175-184, 2012.c Springer-Verlag Berlin Heidelberg 2012.

Rankin et al. article entitled "Daytime Water Detection by Fusing Multiple Cues for Autonomous Off-Road Navigation," Jet Propulsion Laboratory.

Wicked Lasers article entitled "Invisible Lasers," https://www.wickedlasers.com/laser-tech/invisible_lasers.html [Oct. 26, 2017 11:16:24 AM].

* cited by examiner

VEHICLE VISION

BACKGROUND

A vehicle may operate, e.g., move, on a surface such as a road, parking lot, etc., that has irregularities, e.g., depressions such as potholes. When it rains, potholes may be filled with water. A vehicle occupant leaving a vehicle and/or entering the vehicle may step into a pothole filled with water and/or be otherwise disturbed by a pothole.

DETAILED DESCRIPTION

Introduction

Disclosed herein is a system that includes a processor and a memory. The memory stores instructions executable by the processor to detect water on a ground surface, actuate a vehicle exterior light to illuminate a grid pattern on the ground surface, detect a depression at a location of the detected water based on received reflections of the grid pattern, and move a vehicle based on the detected depression.

The instructions may further include instructions to move the vehicle by actuating at least one of a propulsion, a steering, and a brake.

The instructions may further include instructions to move the vehicle based on at least one of an occupancy status of the vehicle and a position of a vehicle door.

The instructions may further include instructions to move the vehicle to a stop location, wherein a distance from a vehicle door to the detected depression exceeds a predetermined threshold.

The vehicle exterior light may include one or more light emitting diodes arranged to emit light in a square grid pattern.

The light emitting diodes may be configured to emit a square grid pattern to be invisible to human eyes.

The instructions may further include instructions to detect the water based on image data received from a vehicle camera sensor.

The instructions may further include instructions to detect the depression upon determining that a distortion of the grid pattern exceeds a predetermined threshold.

The instructions may further include instructions to detect the depression upon determining that a depth of a depression determined based on a distortion of the grid pattern exceeds a depth threshold.

Further disclosed herein is a method including detecting water on a ground surface, actuating a vehicle exterior light to illuminate a grid pattern on the ground surface, detecting a depression at a location of the detected water based on received reflections of the grid pattern, and moving a vehicle based on the detected depression.

The method may further include moving the vehicle by actuating at least one of a propulsion, a steering, and a brake.

The method may further include moving the vehicle based on at least one of an occupancy status of the vehicle and a position of a vehicle door.

The method may further include moving the vehicle to a stop location, wherein a distance from a vehicle door to the detected depression exceeds a predetermined threshold.

The vehicle exterior light may include one or more light emitting diodes arranged to emit light in a square grid pattern.

The light emitting diodes may be configured to emit a square grid pattern to be invisible to human eyes.

The method may further include detecting the water based on image data received from a vehicle camera sensor.

The method may further include detecting the depression upon determining that a distortion of the grid pattern exceeds a predetermined threshold.

The method may further include detecting the depression upon determining that a depth of a depression determined based on a distortion of the grid pattern exceeds a depth threshold.

Further disclosed is a computing device programmed to execute any of the above method steps.

Yet further disclosed is a computer program product, comprising a computer readable medium storing instructions executable by a computer processor, to execute any of the above method steps.

System Elements

Figure 1A:
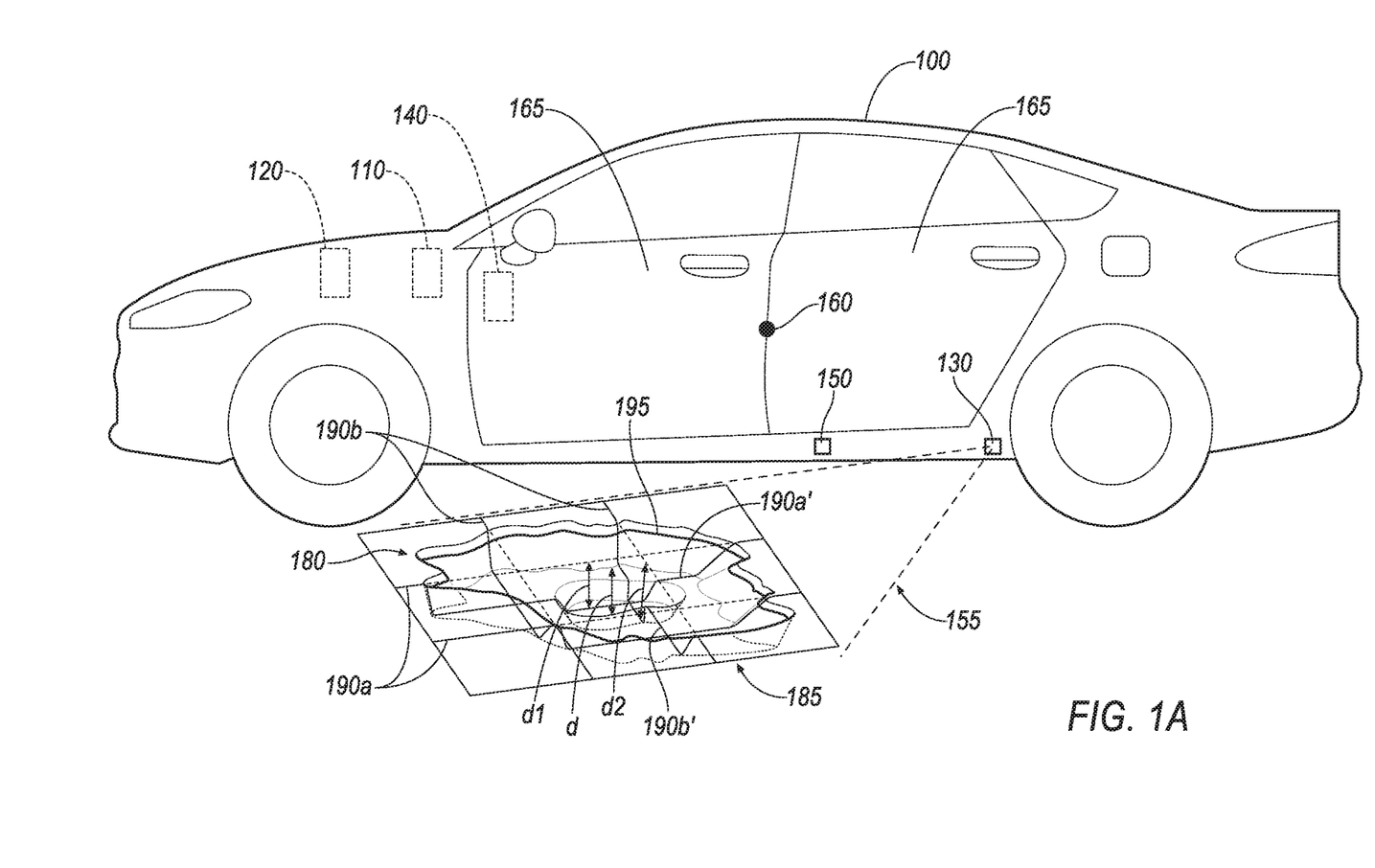
FIG. 1A is a block diagram of an exemplary vehicle with an exterior light illuminating a grid pattern on a ground surface with a depression.

FIG. 1 is a block diagram of a vehicle 100. The vehicle 100 may be powered in variety of known ways, e.g., with an electric motor and/or internal combustion engine. The vehicle 100 may include a computer 110, actuator(s) 120, sensor(s) 130, and a human machine interface (HMI 140), each of which are discussed in more detail below. The vehicle 100 includes a reference point 160 (sometimes for convenience referred to as a "center" point) that may be specified in one of a variety of ways, e.g., at a center of gravity of the vehicle 100, at an intersection of a vehicle 100 longitudinal and lateral axes, etc.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous mode, a semi-autonomous mode, or a non-autonomous mode. For purposes of this disclosure, an autonomous mode is defined as one in which each of vehicle 100 propulsion, braking, and steering are controlled by the computer 110; in a semi-autonomous mode the computer controls one or two of vehicle 100 propulsion, braking, and steering; in a non-autonomous mode, an operator controls the vehicle 100 propulsion, braking, and steering.

The computer 110 may include programming to operate one or more of land vehicle 100 brakes, propulsion (e.g., control acceleration in the vehicle 100 by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 network, e.g., including a communications bus as described further below, more than one processor, e.g., controllers or the like included in the vehicle 100 for monitoring and/or controlling various vehicle controllers, e.g., a powertrain controller, a brake controller, a steering controller, etc. The computer 110 is generally arranged for communications on a vehicle 100 communication network that can include a bus in the vehicle 100 such as a controller area network (CAN) or the like, and/or other wired and/or wireless mechanisms.

Via a communication network of the vehicle 100, the computer 110 may transmit messages to various devices in the vehicle 100 and/or receive messages from the various devices, e.g., an actuator 120, an HMI 140, etc. Alternatively or additionally, in cases where the computer 110 actually comprises multiple devices, the vehicle communication network may be used for communications between devices represented as the computer 110 in this disclosure.

The actuators 120 of the vehicle 100 are implemented via circuits, chips, or other electronic and/or mechanical components that can actuate various vehicle 100 subsystems in accordance with appropriate control signals, as is known. The actuators 120 may be used to control vehicle systems such as braking, acceleration, and/or steering of the vehicles 100.

The sensors 130 of the vehicle 100 may include a variety of devices known to provide data via the vehicle communications bus. For example, the sensors 130 may include one or more camera, radar, infrared, and/or Light Detection And Ranging (LIDAR) sensors 130 disposed in the vehicle 100 and/or on the vehicle 100 providing data encompassing at least some of the vehicle 100 exterior. The data may be received by the computer 110 through a suitable interface such as in known. The camera sensors 130 may be configured to generate image data pertaining to light waves received by the camera sensor 130 which are inside and/or outside human vision wavelength range (e.g., infrared). The computer 110 may receive the image data and operate the vehicle 100 in an autonomous and/or semi-autonomous mode based at least in part on the received object data.

The vehicle 100 may include a Global Positioning System (GPS) sensor 130 configured to determine coordinates of a current location of the vehicle 100. The computer 110 may be programed, using known navigation techniques, to identify a route from the current location to a selected destination, as well as display a map and present driving directions to the selected destination via, e.g., the HMI 140.

Figure 1B:
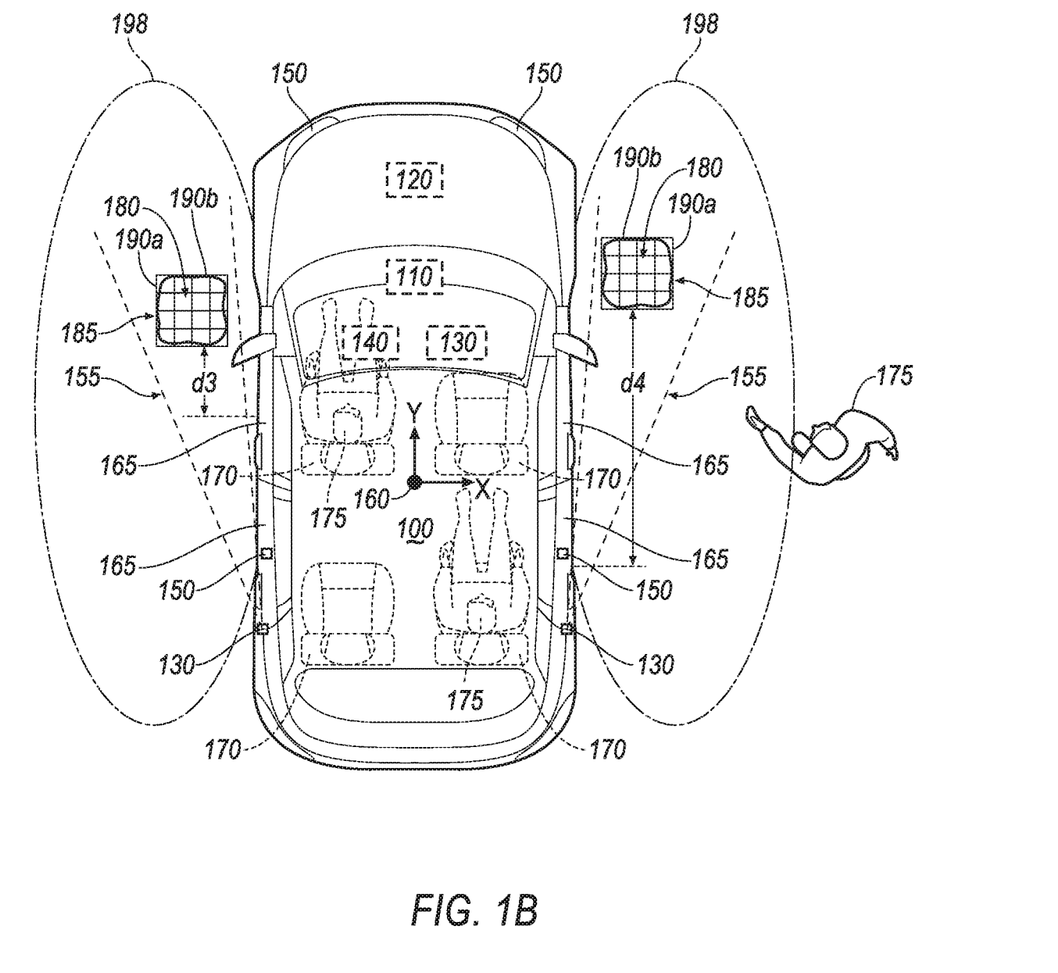
FIG. 1B is a top view of the vehicle of FIG. 1 and the grid patterns.

The HMI 140 presents information to and receives information from an occupant 175 of the vehicle 100. The HMI 140 may be located, e.g., on an instrument panel in a passenger cabin of the vehicle 100, or one or more other locations accessible by the occupant 175. The HMI 140 may include dials, digital readouts, screens such as a touch-sensitive display screen, speakers, and so on for providing information to the occupant 175. The HMI 140 may include buttons, knobs, keypads, microphone, and so on for receiving information from the occupant 175.

The vehicle 100 may operate, e.g., move, on a surface such as road, parking space, etc., that has irregularities such as ground depressions 180. A "ground depression," in the context of this disclosure, includes any type of abnormality (or irregularity), e.g., a pothole or the like, resulting in a variation of depth of a ground surface such as a road, parking space, side walk, etc., where the variation in depth is discontinuous and/or unplanned (i.e., not part of a design of a roadway, driveway, parking lot, etc.). A depression 180 may have various shapes, typically not a regular shape such as a circle, rectangle, etc. A depth d of a depression 180 refers to a depth of a lowest point of the depression 180 relative to the ground surface surrounding the depression 180. When it rains depressions 180 may be filled fully or partially with water. A vehicle occupant 175 leaving a vehicle 100 and/or entering the vehicle 100 may step into a depression 180 filled with water and/or be otherwise inconvenienced by the depression 180. The present disclosure provides a solution to move the vehicle 100 such that a vehicle 100 occupant 175 can enter or exit the vehicle 100 without stepping into a depression 180 which may be filled with water. In the present disclosure, as shown in FIG. 1B, an occupant 175 may be a user in the vehicle 100 and/or a user outside the vehicle 100 intending to enter the vehicle 100.

With reference to FIGS. 1A-1B, the vehicle 100 computer 110 may be programmed to detect water on a ground surface, to actuate a vehicle 100 exterior light 150 to illuminate a grid pattern 185 on the ground surface, to detect a depression 180 at a location of the detected water based on received reflections of the grid pattern 185, and to move the vehicle 100 based on the detected depression 180.

The computer 110 may be programmed to detect the water based on image data received from a vehicle 100 camera sensor 130. For example, as shown in FIG. 1A, the camera sensor 130 may be mounted to an exterior surface of the vehicle 100 and may have a field of view 155. Additionally or alternatively, the camera sensor 130 may be mounted to a front, a right side, and/or a left side of the vehicle 100 exterior. Additionally or alternatively, the camera sensor 130 may be mounted to a vehicle 100 window, a front windshield, etc., with a field of view 155 including a portion of the ground surface around the vehicle 100. The computer 110 may be programmed to detect water upon detecting a reflection of sky on the ground surface, e.g., by detecting sky clouds, stars, sun, moon, buildings, etc. on the ground surface.

Additionally or alternatively, the computer 110 may be programmed to detect the water based on image properties, e.g., a reflection coefficient. An image property herein means a measurement of a physical characteristic or attribute of an image, e.g. reflectivity. Further, the term reflection coefficient (or simply "reflectance") herein means a parameter that describes how much of an electromagnetic wave, e.g., light, is reflected, e.g., from water, asphalt, concrete, etc. For example, the reflection coefficient specifies an amount of light that is reflected from a surface based on an index of refraction of the surface such as water, glass, concrete, asphalt, etc. The computer 110 may be programmed to calculate a reflection coefficient of each portion, e.g., one or more pixels, of the received image data and to determine whether each portion is covered with water.

A grid pattern 185 includes a plurality of intersecting lines 190a, 190b, e.g., a first set of parallel lines 190a intersecting a second set of parallel lines 190b. In one example, the first and second sets of parallel lines 190a, 190b intersect at right angles and form a pattern 185 of squares when viewed from above (see FIG. 1B). As another example, the grid pattern 185 may have a rectangular shape, triangular shape, etc. An illuminated shape of the grid pattern 185 is typically defined by the light source, e.g., a vehicle 100 exterior light 150. For example, the vehicle 100 exterior light 150 may include one or more light emitting diodes (LEDs) arranged to emit light in a square grid pattern 185. Additionally or alternatively, the exterior light 150 may include an optical filter that results the grid pattern 185, e.g., by stopping light beams of the light source of the exterior light 150 except the light beams that result in the grid pattern 185. In one example, the grid pattern(s) 185 may illuminate an area 198 on a right and/or left side of the vehicle 100. For example, the vehicle 100 may include exterior lights 150 to illuminate one or more grid pattern(s) 185 on each right and/or left side of the vehicle 100. In one example, an area 198 may have a rectangular shape, or any other shape. In one example, the grid pattern 185 may cover the entire area 198. In another example, the grid pattern 185 may cover a portion of the area 198 and the computer 110 may be programmed to sweep the area 198 while the vehicle 100 moves, and to store a location, a depth d, etc., of an identified depression 180 in a computer 110 memory.

The exterior light 150 may be configured to emit the square grid pattern 185 to be invisible to human eyes. For example, the emitted light may have a wavelength in infrared light range, e.g., 700 nanometer (nm) to 1 millimeter (mm). Thus, advantageously, the invisible grid pattern 185 may not distract a human, e.g., a pedestrian, occupants 175 of other vehicles, etc. Further, the light waves of the exterior light 150 may at least in part penetrate the water that may have fully or partially filled the depression 180, and illuminate the grid pattern 185 on a bottom surface of the depression 180. Thus, as discussed below, the computer 110 may be programmed to detect a depth d of the depression 180, although the depression 180 may be fully or partially filled with water.

Figure 2:
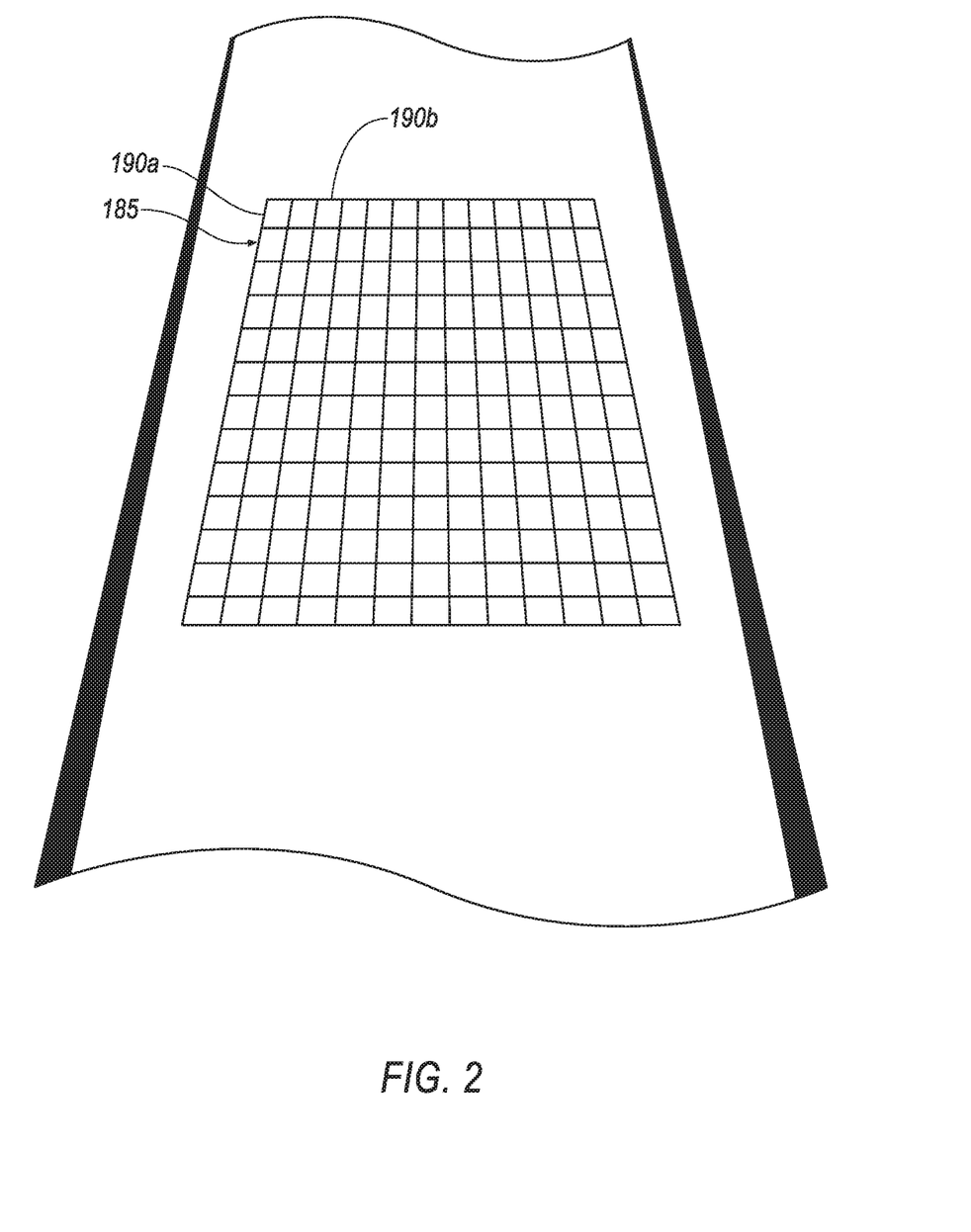
FIG. 2 shows the grid pattern on a ground surface without a depression.

The computer 110 may be programmed to detect the depression 180 upon determining that a distortion of the grid pattern 185 exceeds a predetermined threshold, e.g., a depth threshold, as described below. A distortion, in the present context, is a deviation of a shape of illuminated grid pattern 185 on a ground surface from an expected grid pattern 185 shape. FIG. 2 illustrates a square-shaped illumination when the exterior light 150 illuminates the ground surface with an example square grid pattern 185. However, as shown in FIG. 1A, a shape of the grid pattern 185 on a depression 180 may change based on a shape of the depression 180, e.g., a convex shaped depression 180. The distortion in this example would include a change from an expected square shaped grid pattern 185 that would be found absent a depression 180 to, e.g., a convex shaped grid pattern 185 on the depression 180. As discussed below, a distortion may be determined based on the distances between the distorted lines relative to an expected position of the lines.

The computer 110 may be programmed to determine the expected lines 190a, 190b based on parameters stored in a computer 110 memory, including a direction of the exterior light 150 with respect to a vehicle 100 longitudinal axis, shape and/or dimensions of the grid pattern 185, etc. The computer 110 may be programmed to detect the distorted lines 190a', 190b' based on the received image data that include the reflections of the illuminated grid pattern 185. The distorted lines 190a', 190b', in this example, illustrate how the depression 180 causes a change of the straight lines 190a, 190b, and thereby causes a distortion of the grid pattern 185. The change of the lines 190a, 190b may include bending, breaking apart, etc.

In one example, the computer 110 may be programmed to detect the depression 180 upon determining, based on a distortion of the grid pattern 185, that a depth d of the depression 180 exceeds a depth threshold, e.g., 5 centimeter (cm). In one example, the computer 110 may be programmed to determine the depth d of the depression 180 based on the determined maximum distances $d_1$, $d_2$ of the distorted lines 190a', 190b' from the expected lines 190a, 190b. The maximum distances $d_1$, $d_2$ are the maximum distances or gaps between a distorted line and the respective expected line. In one example, the computer 110 may be programmed to determine the depth d of the depression 180 based on a maximum of the maximum distances $d_1$, $d_2$, etc. of the lines distorted over the depression 180. The computer 110 may be programmed to detect the distorted lines 190a', 190b' using image processing techniques and to determine the maximum distances $d_1$, $d_2$, etc., between the distorted lines 190a', 190b' and the expected lines 190a, 190b. In one example, the computer 110 may be programmed to determine a distance between an expected line 190a, 190b, and a respective distorted line 190a', 190b', and determine the maximum distances $d_1$, $d_2$, etc. based on the determined distances. In locations in which the lines 190a, 190b match (i.e., no substantially no deviation is present), the determined distance is substantially 0 (zero). Additionally or alternatively, the computer 110 may be programmed to associate a location of where the maximum of the maximum distances $d_1$, $d_2$, etc. is identified as a location of the depression 180. As discussed below, the computer 110 may be programmed to move the vehicle 100 based on the identified location of the depression 180.

As another example, the computer 110 may be programmed to detect the grid pattern 185 on the ground surface, and to determine a deviation by comparing the detected grid pattern 185 to a stored expected grid pattern 185. The computer 110 may be programmed to detect the grid pattern 185 using conventional pattern recognition techniques. The computer 110 may be programmed to store information such as a shape, dimensions, etc. of the expected grid pattern 185 in a computer 110 memory. The computer 110 may be programmed to identify a distortion of the grid pattern 185 (e.g., in a numerical format such as a percentage) relative to the stored expected grid pattern 185. The computer 110 may be programmed to identify the distortion based on a mathematical model comparing curvature of distorted lines 190a', 190b' to the expected lines 190a, 190b. In the context of this disclosure, a first distortion 0% (zero) means the lines 190a, 190b and the lines 190a', 190b' match, whereas a second distortion 100% means the computer 110 no similarity to the expected lines 190a, 190b was detected in a pattern 185 recognized based on the distorted lines 190a', 190b'. In one example, the computer 110 may be programmed to detect a depression 180 upon determining that an amount of identified distortion of the grid pattern 185 exceeds a pattern 185 distortion threshold, e.g., 30%.

As discussed above, stepping in a depression 180 filled with water may be inconvenient for an occupant 175 entering or exiting the vehicle 100. The computer 110 may be programmed to determine whether the detected depression 180 is filled with water upon determining that a detected depression 180 area and an area where water is detected on the ground surface, at least partially overlap. Thus, the computer 110 may be programmed to move the vehicle 100 to a stop location by actuating at least one of a propulsion, a steering, and a brake. The computer 110 may be programmed to move the vehicle 100 based on at least one of an occupancy status of the vehicle 100, a position of a vehicle 100 door 165, and/or a location of a depression 180.

Occupancy status, in the present disclosure, means data about whether and/or how a vehicle 100 is occupied, and typically includes data pertaining to a number and/or position(s) of vehicle 100 occupants 175. The position of an occupant 175 may be specified based on a position of a vehicle 100 seat 170 including the occupant 175, e.g., front right, front left, rear right, rear left, etc. In one example, the occupancy status of the vehicle 100 may be: "front left and rear right seats 170 occupied." Additionally, the occupancy status of the vehicle 100 may include an expected occupancy of the vehicle 100 when the vehicle 100 stops to pick up passengers. For example, the occupancy status of the vehicle 100 may be: "one occupant 175 expected at front right seat 170." The vehicle 100 computer 110 may be programmed to determine the occupancy status based on data received from the vehicle 100 sensors 130, e.g., a camera sensor 130, an occupancy (e.g., weight) sensor 130 included in the vehicle 100 seats 170, etc.

The vehicle 100 may have various numbers of doors 165, two, four, etc., based on the vehicle 100 type. In one example, the vehicle 100 with a front right, front left, rear right, and rear left seat 170 may have a front right, front left, rear right, and rear left door 165. Thus, an occupant 175 occupying the front right seat 170 may enter and/or exit the vehicle 100 via the front right door 165. The locations of the doors 165 of the vehicle 100 may be specified relative to the vehicle 100 reference point, e.g., in a two-dimensional Cartesian coordinate system including longitudinal and lateral coordinates.

The computer 110 may be programmed to move the vehicle 100 to a stop location, wherein a distance from a vehicle 100 door 165 to a location of the detected depression 180 exceeds a predetermined distance threshold, e.g., 1 meter. A stop location, in the present context, is a location in which the vehicle 100 stops for a vehicle 100 occupant 175 to exit and/or enter the vehicle 100. A stop location may be specified by GPS location coordinates or the like. A specific vehicle 100 door 165 for an occupant 175 to enter or exit the vehicle 100 may be determined based on the stop location of the vehicle 100 and the occupancy status of the vehicle. For example, an occupant 175 may be specified to enter a vehicle 100 through a right-rear door when the vehicle 100 is pulled to a right side of a roadway, and the occupant 175 is to sit in a rear seat 170.

The computer 110 may be programmed to output a message to the vehicle 100 HMI 140 upon determining that a depression 180 is located within a distance, e.g., 1 m, of a door 165 via which a vehicle 100 occupant 175 intends to enter and/or exit. The computer 110 may be programmed to determine that an occupant 175 intend to enter and/or exit, e.g., based on data received from vehicle 100 sensors 130. The computer 110 may be programmed to move the vehicle 100 based on the location of the vehicle 100 door 165 through which the occupant 175 intends to enter and/or exit, the location of the depression 180, and/or location of other objects such as other cars, road barriers, etc., around the vehicle 100. For example, the computer 110 may be programmed to determine whether to move the vehicle 100 forward or backward based on the location of the depression 180, the location of other objects around the vehicle 100, and/or the position of the vehicle 100 door 165 through which the occupant 175 intends to enter and/or exit.

Processing

Figure 3:
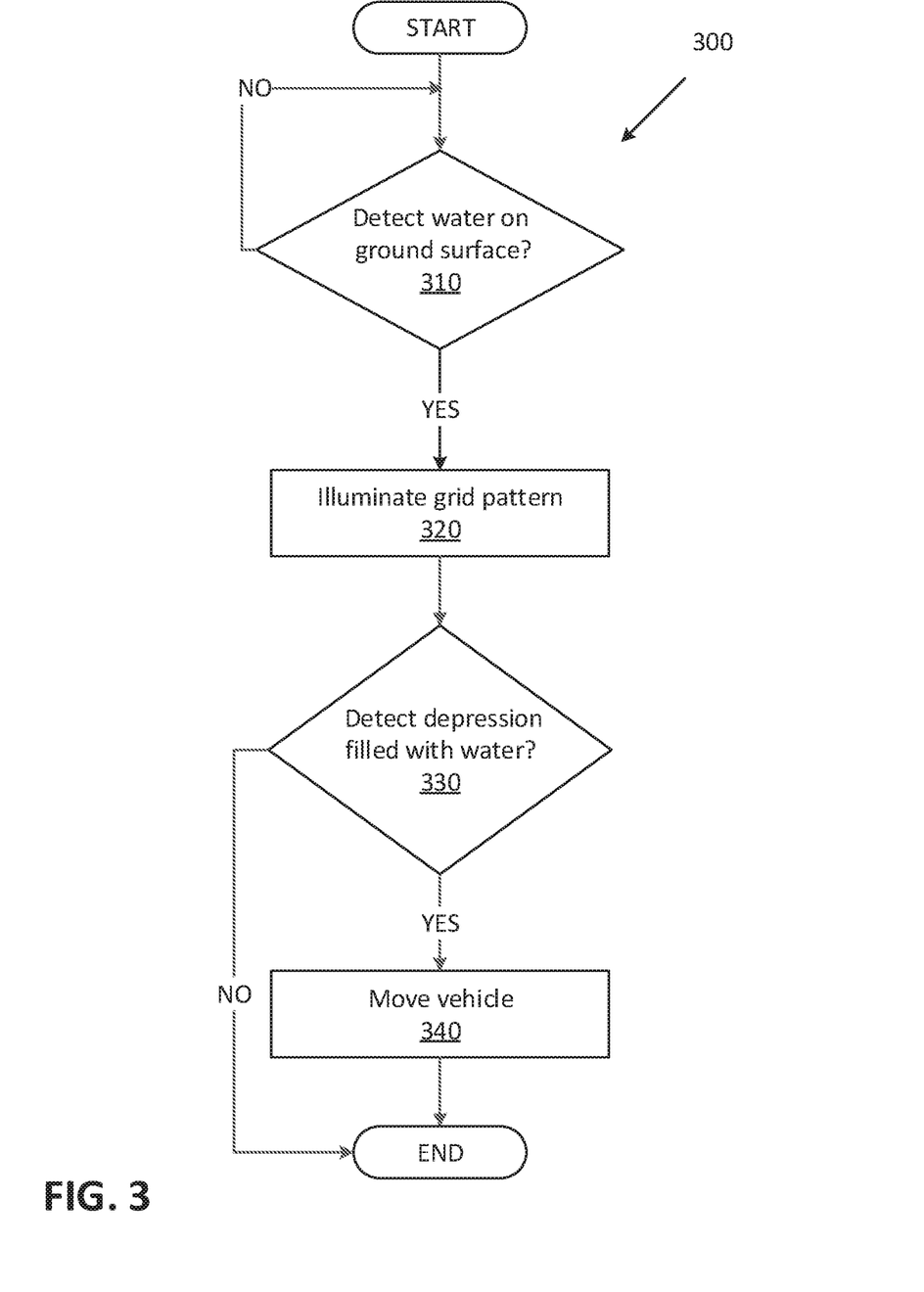
FIG. 3 is a flowchart of an exemplary process for identifying depressions filled with water.

FIG. 3 is a flowchart of an exemplary process 300 for identifying depressions filled with water. The vehicle 100 computer 110 may be programmed to execute blocks of the process 300.

The process 300 begins in a decision block 310, in which the computer 110 determines whether water is detected on a ground surface. The computer 110 may be programmed to detect water based on image data received from the vehicle 100 camera sensor(s) 130, as described above. If the computer 110 detects water on the ground surface, then the process 300 proceeds to a block 320; otherwise the process 300 returns to the decision block 310.

In the block 320, the computer 110 actuates a vehicle 100 exterior light 150 to illuminate a grid pattern 185 on the ground surface. The grid pattern(s) 185 may be illuminated an area 198 on a right and/or left side of the vehicle 100. The vehicle 100 may include exterior lights 150 to illuminate one or more grid pattern(s) 185 on each right and/or left side of the vehicle 100.

Next, in a decision block 330, the computer 110 determines whether a depression 180 is detected that is filled with water. The computer 110 may be programmed to detect a depression 180 upon determining that a distortion of the grid pattern 185 exceeds a predetermined threshold. The computer 110 may be programmed to detect a distortion by detecting distorted lines 190a', 190b' based on the received image data that include the reflections of the illuminated grid pattern 185. In one example, the computer 110 may be programmed to detect a depression 180 upon determining that a distortion of the grid pattern 185 exceeds a depth threshold, e.g., 5 cm, as described above. In another example, the computer 110 may be programmed to detect a depression 180 upon determining (using pattern recognition as discussed above) that a distortion of the grid pattern 185 exceeds a pattern distortion threshold, e.g., 30%. If the computer 110 determines that a depression 180 filled with water is detected, then the process 300 proceeds to a block 340; otherwise the process 300 ends, or alternatively returns to the decision block 310, although not shown in FIG. 3.

In the block 340, the computer 110 actuates a vehicle 100 component, e.g., an actuator 120, to move the vehicle 100. The computer 110 may be programmed to move the vehicle 100 by actuating at least one of a vehicle 100 propulsion, steering, and/or brake. The computer 110 may be programmed to move the vehicle 100 based on an occupancy status of the vehicle 100, a position of a vehicle 100 door 165, and/or an identified location of the detected depression 180, e.g., to allow an occupant to avoid stepping in a water-filled depression, as described above.

Following the block 340, the process 300 ends, or alternatively returns to the decision block 310, although not shown in FIG. 3.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
   detect water on a ground surface based on data collected from a sensor of a vehicle;
   actuate a vehicle exterior light disposed on an exterior of the vehicle to illuminate a grid pattern on the ground surface;
   detect a depression at a location of the detected water based on received reflections of the grid pattern; and
   actuate at least one of a propulsion, a steering, or a brake to move the vehicle to a stop location exceeding a predetermined distance away from the detected depression.

2. The system of claim 1, wherein the instructions further include instructions to move the vehicle based on at least one of an occupancy status of the vehicle and a position of a vehicle door.

3. The system of claim 1, wherein the stop location is a distance from a vehicle door to the detected depression exceeding a predetermined threshold.

4. The system of claim 1, wherein the vehicle exterior light includes one or more light emitting diodes arranged to emit light in a square grid pattern.

5. The system of claim 4, wherein the light emitting diodes are configured to emit a square grid pattern to be invisible to human eyes.

6. The system of claim 1, wherein the instructions further include instructions to detect the water based on image data received from a vehicle camera sensor.

7. The system of claim 1, wherein the instructions further include instructions to detect the depression upon determining that a distortion of the grid pattern exceeds a predetermined threshold.

8. The system of claim 1, wherein the instructions further include instructions to detect the depression upon determining that a depth of the depression determined based on a distortion of the grid pattern exceeds a depth threshold.

9. A method, comprising:
   detecting water on a ground surface based on data collected from a sensor of a vehicle;
   actuating a vehicle exterior light disposed on an exterior of the vehicle to illuminate a grid pattern on the ground surface;
   detecting a depression at a location of the detected water based on received reflections of the grid pattern; and
   actuating at least one of a propulsion, a steering, or a brake to move the vehicle to a stop location exceeding a predetermined distance away from based on the detected depression.

10. The method of claim 9, further comprising moving the vehicle based on at least one of an occupancy status of the vehicle and a position of a vehicle door.

11. The method of claim 9, wherein the stop location is a distance from a vehicle door to the detected depression exceeding a predetermined threshold.

12. The method of claim 9, wherein the vehicle exterior light includes one or more light emitting diodes arranged to emit light in a square grid pattern.

13. The method of claim 12, wherein the light emitting diodes are configured to emit a square grid pattern to be invisible to human eyes.

14. The method of claim 9, further comprising detecting the water based on image data received from a vehicle camera sensor.

15. The method of claim 9, further comprising detecting the depression upon determining that a distortion of the grid pattern exceeds a predetermined threshold.

16. The method of claim 9, further comprising detecting the depression upon determining that a depth of the depression determined based on a distortion of the grid pattern exceeds a depth threshold.

* * * * *